(12) United States Patent
Yuan

(10) Patent No.: US 12,198,094 B2
(45) Date of Patent: Jan. 14, 2025

(54) TRACEABILITY MANAGEMENT METHOD FOR SUPPLY CHAINS OF AGRICULTURAL, FISHERY AND ANIMAL HUSBANDRY PRODUCTS

(71) Applicant: National Yunlin University of Science and Technology, Douliu (TW)

(72) Inventor: Ming-Jian Yuan, Douliu (TW)

(73) Assignee: National Yunlin University of Science and Technology, Douliu (TW)

( * ) Notice: Subject to any disclaimer, the term of this patent is extended or adjusted under 35 U.S.C. 154(b) by 530 days.

(21) Appl. No.: 17/338,190

(22) Filed: Jun. 3, 2021

(65) Prior Publication Data
US 2022/0391822 A1 Dec. 8, 2022

(51) Int. Cl.
G06Q 10/087 (2023.01)
G06F 16/29 (2019.01)
G06Q 10/0833 (2023.01)

(52) U.S. Cl.
CPC .......... *G06Q 10/087* (2013.01); *G06F 16/29* (2019.01); *G06Q 10/0833* (2013.01)

(58) Field of Classification Search
CPC .. G06Q 10/087; G06Q 10/0833; G06F 16/29; G06F 16/285
See application file for complete search history.

(56) References Cited

U.S. PATENT DOCUMENTS

| | | | | |
|---|---|---|---|---|
| 5,675,780 A * | 10/1997 | Plant-Mason | ........ | G11B 27/034 |
| 7,705,735 B2 * | 4/2010 | Pape | ...................... | G06Q 10/10 340/539.19 |
| 8,019,633 B2 * | 9/2011 | Stroman | ................. | G06Q 30/00 705/7.11 |
| 8,210,430 B1 * | 7/2012 | Grant | .................... | G06Q 10/087 235/383 |
| 8,392,225 B2 * | 3/2013 | Sribhibhadh | .......... | G06Q 10/06 705/7.11 |
| 10,897,877 B2 * | 1/2021 | Hicks | .................... | H04L 9/3239 |
| 11,682,095 B2 * | 6/2023 | Coast | ..................... | G06Q 10/10 705/28 |
| 2002/0007295 A1 * | 1/2002 | Kenny | .................... | G06Q 30/02 705/307 |
| 2005/0251449 A1 * | 11/2005 | Pape | .................... | G06Q 10/087 705/300 |
| 2006/0038010 A1 * | 2/2006 | Lucas | .................. | G06Q 20/203 340/572.1 |

(Continued)

FOREIGN PATENT DOCUMENTS

CN 103761546 4/2014

*Primary Examiner* — Garcia Ade

(74) *Attorney, Agent, or Firm* — Guice Patents PLLC

(57) ABSTRACT

A traceability management method for supply chains of agricultural, fishery and animal husbandry products provided by the invention is provided for a user for inputting an identification data, and searching for at least one first data, second data and/or third data matching the identification data from databases, and then performing correlated recursive mathematical operation on the first data, the second data, and/or the third data to search for and establish a traceability node having connection relationship with the first data, the second data and/or the third data. Thereby, relevant historical footprints of a product in a supply chain between manufactories can be traced.

8 Claims, 11 Drawing Sheets

(56) References Cited

U.S. PATENT DOCUMENTS

| | | | |
|---|---|---|---|
| 2009/0198596 A1* | 8/2009 | Dolan | G06Q 10/06 |
| | | | 705/28 |
| 2009/0300054 A1* | 12/2009 | Fisher | G06F 16/84 |
| | | | 707/999.102 |
| 2010/0153870 A1* | 6/2010 | Hoffmann | G06F 3/04842 |
| | | | 715/767 |
| 2012/0179699 A1* | 7/2012 | Ward | G06F 40/149 |
| | | | 707/E17.018 |
| 2016/0253383 A1* | 9/2016 | Tokoda | G06F 16/2455 |
| | | | 707/714 |
| 2016/0314169 A1* | 10/2016 | Wenzler | G06F 16/282 |
| 2017/0212951 A1* | 7/2017 | Wenzler | G06F 16/93 |
| 2018/0114168 A1* | 4/2018 | Ryan | G06Q 10/08 |
| 2018/0165644 A1* | 6/2018 | Cochran | G06Q 30/0635 |
| 2020/0170265 A1* | 6/2020 | Goldfarb | A22C 13/0026 |

\* cited by examiner

TRACEABILITY MANAGEMENT METHOD FOR SUPPLY CHAINS OF AGRICULTURAL, FISHERY AND ANIMAL HUSBANDRY PRODUCTS

BACKGROUND OF THE INVENTION

Field of Invention

The invention is related to data management technology, and more particularly to a traceability management method for supply chains of agricultural, fishery and animal husbandry products.

Related Art

Just like other industries, products produced by agriculture, fishery and animal husbandry require the joint cooperation of upstream, midstream, and downstream manufacturers to complete the production, delivery, and sales of the products. Among them, taking the chicken husbandry as an example, various heterogeneous manufacturers and companies including feed factories, vaccine plants, chick hatcheries, feedlots, slaughterhouses, cutting plants, processing plants, cold chain logistics, stores, and restaurants are involved from feeding to selling to form an industry supply chain.

Furthermore, in order to ensure food safety, food safety has been the focus of management of various manufacturers. However, although some manufacturers use manual record management, lack of reliability and instantaneity of their data is a long-standing problem.

In view of the aforementioned problems, some manufacturers have switched to data systems for recording. However, because their data is usually stored in different databases or different files, it is quite difficult to connect and correlate the production and sales records in raw materials-semi-finished products-finished products of upstream, midstream, and downstream manufacturers. Therefore, consumers often only get fragments of food safety information.

SUMMARY OF THE INVENTION

A main object of the invention is to provide a traceability management method for supply chains of agricultural, fishery and animal husbandry products capable of digitally managing various data in agricultural, fishery and animal husbandry supply chains, so as to improve efficacies of concatenation and instantaneity of relevant data.

Another object of the invention is to provide a traceability management method for supply chains of agricultural, fishery and animal husbandry products capable of using traceability nodes obtained by mathematical operation to facilitate users to quickly search for cross-plant/site data that they want to query.

In order to achieve the above-mentioned objects, the invention provides a traceability management method for supply chains of agricultural, fishery and animal husbandry products provided for a user for inputting an identification data, and searching for at least one first data, second data and/or third data matching the identification data from databases, and then performing correlated recursive mathematical operation on the first data, the second data, and/or the third data to search for and establish a traceability node having connection relationship with the first data, the second data and/or the third data. Thereby, relevant historical footprints of a product in a supply chain between manufactories can be queried.

Wherein, the identification data comprises a company code to be checked, a batch number to be checked, and an order number to be checked.

Wherein, the first data comprises a company code data and an inventory data.

Wherein, the second data comprises a source document and a return document, the source document comprises purchase document, material requisition document, subcontracted purchase document, delivery document, sales document, warehousing document, transfer document, material transfer document, and document of changes in inventory, the return document comprises return purchase document, material return document, subcontracted return purchase document, and sales return document.

Wherein, the database further comprises the third data, the third data comprises source manufacturing order, requisition manufacturing order, and batch number manufacturing process data, the batch number manufacturing process data comprises process, manufacturing process, manufacturing batch number, parent manufacturing batch number, and requisition batch number, the source document and the return document record the first data and/or the third data, respectively.

DETAILED DESCRIPTION OF THE INVENTION

First of all, the terms "first", "second" and "third" disclosed in the invention represent distinguishing of similar technical features, meaning that they are used to distinguish different data, messages, equipment, or modules, etc., and it does not represent the sequential arrangement of "first", "second" and "third", does not represent any order of execution, does not mean that they are necessarily correlated to one another, nor does it represent their functions or structures are necessarily different or the same, and it does not limit "first", "second" and "third" to be different types or the same type, which shall be explained first.

Figure 1:
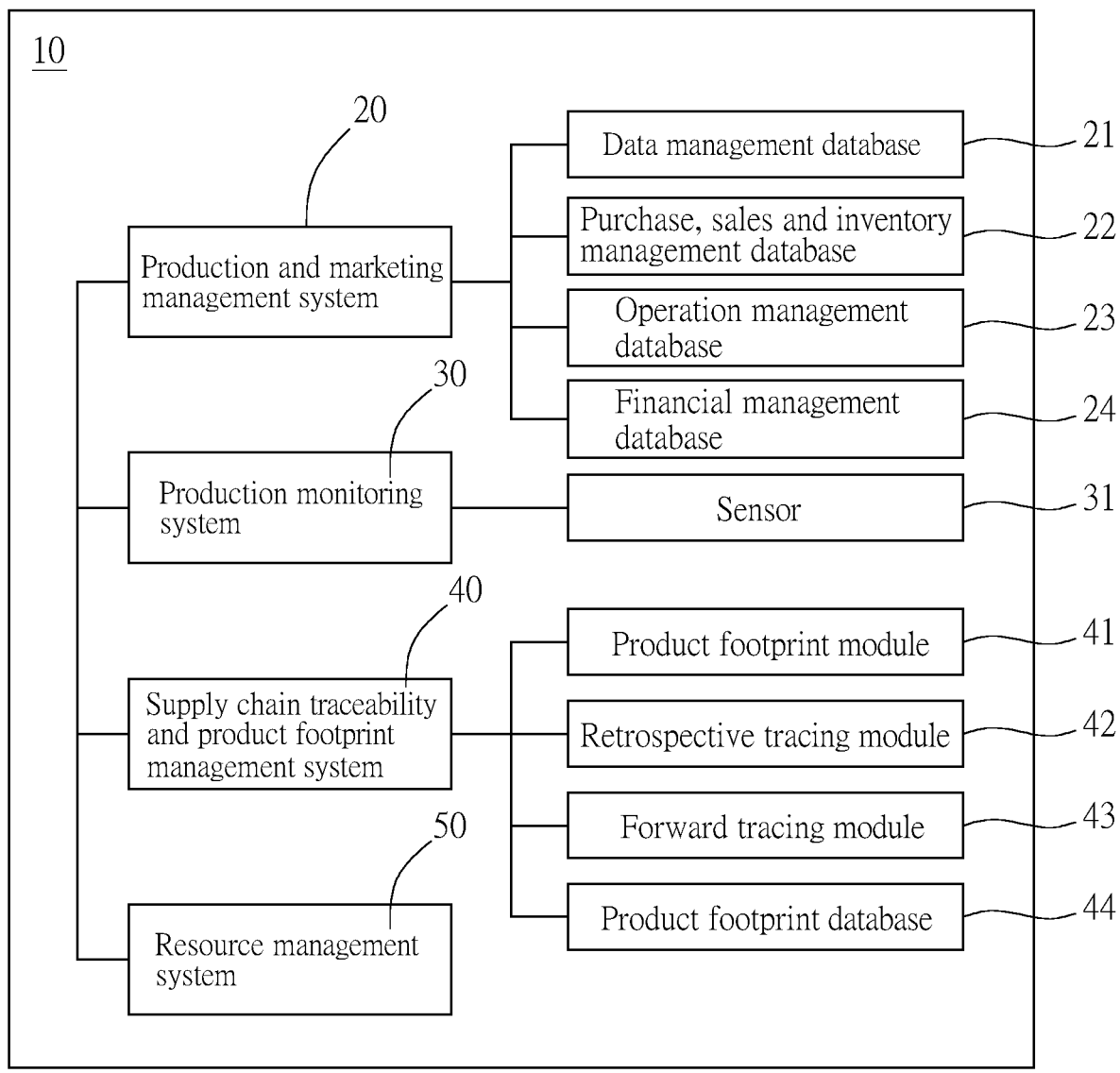
FIG. 1 is a system block diagram according to a preferred embodiment of the invention.

Then, please refer to FIG. 1, a traceability management method for supply chains of agricultural, fishery and animal husbandry products provided in a preferred embodiment of the invention can be applied to a platform 10, the platform 10 mainly comprises a production and marketing management system 20, a production monitoring system 30, a supply chain traceability and product footprint management system 40, and a resource management system 50, these systems are connected to one another by wired or wireless communication technology, the single platform 10 provides management functions for products of each manufacturer in the supply chains, provides independent digital management for each of the manufacturers, and is capable of automatically generating and releasing product footprints to achieve objects of automatic management and monitoring.

The platform 10 can be, but is not limited to being, constructed with computer programs and stored in a computing device (such as desktop computer, notebook computer, smart phone or tablet computer, etc.) or a server to be read or executed by end users.

The production and marketing management system 20 comprises a data management database 21, a purchase, sales and inventory management database 22, an operation management database 23, and a financial management database 24. Wherein the data management database 21 stores a plurality of first data, each of the first data can be, but is not limited to company code data, site (factory) category data, item main classification data, item sub-classification data, product name data, item data, inventory data, item number data, brand data, item registration number data, item schedule data, supplier data, manufacturer data, client data, user data, and employee data. Wherein the site (factory) category data comprises site (factory) category number and site (factory) category name; the item main classification data can be, but is not limited to feed, vaccine, chicken, frozen chicken products or others; the item sub-classification data can be, but is not limited to free-range chicken feed, antibiotic vaccine, anti-virus vaccine, chick, adult chicken, red feather native chicken or waste; the supplier data comprises supplier number, supplier name, supplier's government uniform invoice number, supplier phone number, and supplier address; the manufacturer data comprises manufacturer number, manufacturer name, manufacturer's government uniform invoice number, manufacturer phone number, and manufacturer address; and the client data comprises client number, client name, client's government uniform invoice number, contact person, contact phone number, fax number, and delivery address.

The purchase, sales and inventory management database 22 stores a plurality of second data, and each of the second data can be, but is not limited to a source document and a return document. Wherein, the source document can be, but is not limited to purchase document, material requisition document, subcontracted purchase document, delivery document, sales document, warehousing document, transfer document, material transfer document, and document of changes in inventory; and the return document can be, but is not limited to return purchase document, material return document, subcontracted return purchase document, and sales return document.

The operation management database 23 stores a plurality of third data, and each of the third data can be, but is not limited to operation order data, batch number manufacturing process data, instantaneous production record of batch number manufacturing process, batch number resume data, and operation order data. Wherein, the operation order data comprises operation order type, operation order number, document date, estimated production quantity, production unit, item specification, source manufacturing order and requisition manufacturing order, the source manufacturing order can be divided into feeding manufacturing order, planting manufacturing order, processing manufacturing order, slaughter manufacturing order, breeding manufacturing order, catching manufacturing order, transportation manufacturing order, harvesting manufacturing order, fertilization manufacturing order, automatic bait casting/drug dosing manufacturing order, fishing order/operation manufacturing order, packaging manufacturing order, random inspection manufacturing order, warehousing manufacturing order, and stocking manufacturing order; the requisition manufacturing order can be divided into in-plant manufacturing order, and subcontracted manufacturing order.

The batch number manufacturing process data comprises batch number, process, workstation/supplier, manufacturing process, operation start time, operation end time, operators, and growth records. Wherein, the batch number can be divided into production (manufacturing) batch number, requisition batch number, parent production (manufacturing) batch number, sales batch number, purchase batch number, warehousing batch number, and subcontracted purchase batch number. The manufacturing process can be divided into, but not limited to feeding process, planting process, processing process, slaughter process, breeding process, catching process, transportation process, harvesting process, fertilization process, automatic bait casting/drug dosing process, fishing order/operation process, packaging process, warehousing process, and random inspection process. The process executes the manufacturing process sequentially.

The instantaneous production record of batch number manufacturing process comprises batch number manufacturing process, inbound quantity, outbound quantity, transfer quantity, scrap quantity, duplicated work quantity, short quantity, excess quantity, inbound time, and outbound time. The batch number resume data can be, but is not limited to nutrition label, inspection data, abnormal category, and abnormal reason. The inspection data can be, but is not limited to poultry health certificates, and phytosanitary certificates.

In addition, different types of the data can correspond to one another, and each of the manufacturing orders and each of the manufacturing processes corresponds to other correlated data, for example: correlated data of food processing operation-seasoning and pickling for the processing order is as shown in the following table.

| Item number | Item name | Brand number | Brand name | Quantity required | Unclaimed quantity | Quantity received | Unit | Feeding operation number | Feeding operation name | Estimated material requisition date | Actual material requisition date |
|---|---|---|---|---|---|---|---|---|---|---|---|
| MIT001 | Chicken breast (Semi-finished product) | B001 | Self made | 100.0 | −50.0 | 50.0 | Package | 001E0100 | Food processing operation-seasoning and pickling | 2020 Aug. 10 | 2020 Aug. 8 |

It should be particularly explained that, in this embodiment, the first data, the second data, and the third data are stored in various corresponding fields in different databases according to their types, attributes and categories. In other embodiments, the first data, the second data, and the third data can also be stored in the same database, which are not limited in the manner listed in the description.

In addition, the documents respectively comprise various types of information of different corresponding operation activities. In this embodiment, each of the documents respectively corresponds to the correlated first data and/or third data. For example, the material requisition document comprises information of requisition of required raw materials according to the source manufacturing order or the manufacturing process, and the requisition batch number. The raw materials comprise feed, vaccines, antibacterial agents, and feed additives, wherein the feed additives can be, but are not limited to vitamins, amino acids, minerals, antifungal agents, mycotoxin adsorbents, growth factors, enzymes, live yeasts, yeast substrates, acidulants, and ammonia decomposition neutralizers.

The following table lists correlated information of the sales document.

The financial management database 24 stores management financial statements, accounting title details, accounting books, accounting entry vouchers, business tax declaration data, and purchase and sales tax data.

The production monitoring system 30 has at least one sensor 31, which is not limited to being installed in production lines, mobile vehicles (such as drones, cars, smart robots), agricultural machinery or related facilities (such as farms, fish farms, etc.), and the sensor 31 is used to detect water quality, soil temperature, leaf humidity, light intensity, temperature and humidity, carbon dioxide, carbon monoxide, ammonia, dust, wind speed, and padding humidity in order to monitor current operation situations of agricultural products in procedures of production, manufacturing or packaging, so as to carry out the corresponding manufacturing processes, and transmit maintenance data of the operations to the production and marketing management system 20 to update the relevant data. In addition, hyperspectral technology can also be used to detect whether the agricultural products have pests or diseases.

The supply chain traceability and product footprint management system 40 comprises a product footprint module 41, a retrospective tracing module 42, a forward tracing module 43, and a product footprint database 44. Wherein the product footprint module 41 is respectively connected to the retrospective tracing module 42, the forward tracing module 43, and the product footprint database 44, and through

| Document category | Document number | Document date | Site (factory) category number | Site (factory) category name | Client number | Client name | Delivery address |
|---|---|---|---|---|---|---|---|
| A21 | 20200713001 | 2020 Jul. 8 | Fty001 | Leadray Livestock Operation Headquarters | TPAC | Taipei Livestock Products Marketing Corporation | Huanhe South Road . . . |

In addition, the production and marketing management system 20 is capable of receiving client orders, performing order procedures, issuing an operation order based on an order or a production plan, and allowing users to set batch numbers, estimated production volumes, site (factory) category, product name, item, supplier, brand, etc. on the platform 10 in order to change or update relevant data in the databases. In addition, the platform 10 allows the issuance of the operation order to execute the corresponding manufacturing processes.

mathematical operation capable of generating a product footprint webpage for consumers to browse and query.

The product footprint database 44 comprises a plurality of fourth data, and each of the fourth data can be, but is not limited to footprint number, footprint name, and footprint type. Wherein, each of the fourth data respectively has the corresponding and correlated first data, second data, and/or third data. In one embodiment, the footprint name is "transportation information", the footprint type is "other", and the correlated information is shown in the following table.

| Footprint number | Footprint name | Item number | Product name | Brand number | Brand name | Footprint type | Manufacturing process/source manufacturing order |
|---|---|---|---|---|---|---|---|
| C001 | Transportation information | LB01T001 | He Duan-Red Feather Native Chicken | B004 | He Duan | Other | Transportation operations |

The forward tracing module 43 is capable of searching for a flow direction of bad raw materials based on the various data contained in the databases, and timely and accurately recovering the problematic agricultural products, so as to control risks and losses caused by the bad raw materials. For example, if it is known that there is a problem with chicks of a certain batch number, the forward tracing module 43 searches out all the purchase documents of the batch of problematic chicks, and traces downstream whether there is breeding, delivery or auction for each of the purchase documents, and the traced problem products, whether semi-finished or finished products, are collected in a recycling list, so that relevant units can quickly recycle according to the list. Furthermore, the forward tracing module 43 is capable of further tracing downstream whether there is delivery to a wholesale market for auction in a cross-company manner. Wherein, if the problematic chicks are delivered to a wholesale market, then trace whether there are any chicks that have not yet been auctioned or have been auctioned for delivery. If there are problematic chickens that have been auctioned, continue to trace whether the problematic chickens delivered to the slaughterhouse are being processed or have been processed and delivered. If there are problematic chicken products that have been processed and delivered, continue to track down the vendors who are selling the goods.

The retrospective tracing module 42 is capable of tracing a source of defective raw materials used in the problem products and their batch numbers based on the various data contained in the databases. For example, if there is a problem with the frozen chickens sold by a vendor, the retrospective tracing module 42 is capable of retrospectively tracing whether there is an abnormality in a production process of a processing factory from the sales document of the problem products, and the production process refers to various operational activities represented by the source manufacturing orders and/or the manufacturing processes, such as packaging, slaughter, veterinary inspection, auction, and requisition of raw material chickens. In addition, the retrospective tracing module 42 is capable of further tracing the feeding of a farm based on the purchase document of auctioned chickens in a cross-company manner, such as logistics and feeding management to requisition and purchase of feeding raw materials. And, the retrospective tracing module 42 is capable of tracing the most upstream manufacturers of chick feeding, vaccination, and feed supply based on the purchase document of raw materials.

In addition, the platform 10 can be log in by users to use the supply chain traceability and product footprint management system 40 to execute the method disclosed in the invention. Main steps of the method are as follows: first, receiving an identification data input by a user, and searching for at least one first data, second data or third data matching the identification data from the data databases.

Wherein, the identification data is a company code to be checked, a batch number to be checked, or an order number to be checked that the user wants to query. It should be explained in detail that the identification data can be any key character, and the character is any one or a combination of Chinese characters, English letters, character strings, numbers, or other symbols.

Then, performing correlated recursive mathematical operation on the first data, the second data, and/or the third data to search for and establish a traceability node with connection relationship with the first data, the second data and/or the third data. Thereby, relevant historical footprints of a product can be queried. Wherein the traceability node can be, but is not limited to batch number node, manufacturing batch number node, manufacturing order node, batch number manufacturing process node, client node, supplier node, warehouse node, or inventory node, and each of the nodes can be classified according to different types, and each of the nodes is further connected with corresponding child nodes and/or leaf nodes respectively.

In addition, the more detailed implementation steps in this embodiment are as follows.

As shown in FIGS. 2 to 6, the forward tracing module 43 is capable of executing the following procedures:

A: Root Node Procedure and Node Classification Confirmation Procedure

Figure 2:
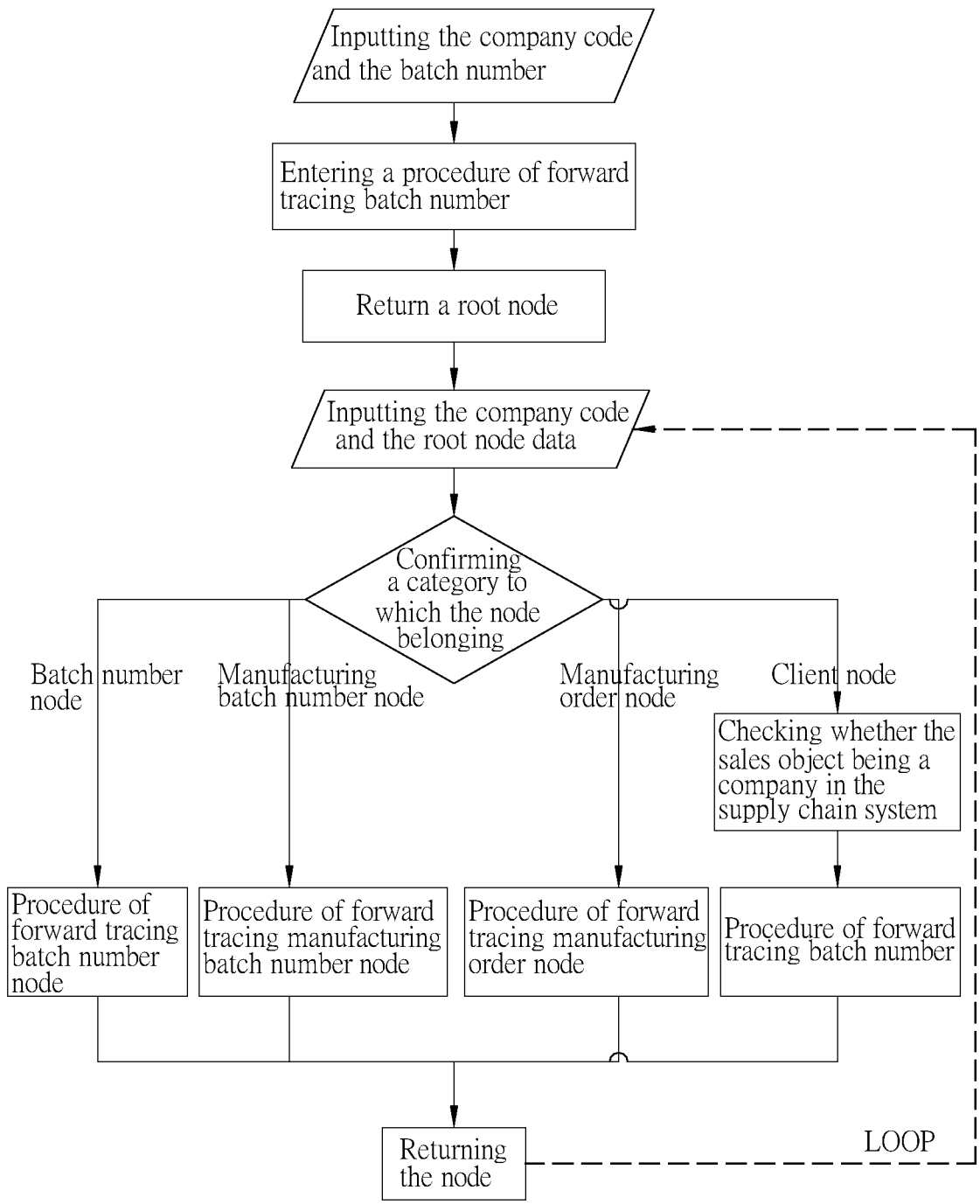
FIG. 2 is a flow chart of a root node procedure and a node classification confirmation procedure executed by a forward tracing module according to a preferred embodiment of the invention.

As shown in FIG. 2, based on a company code to be checked and/or a batch number to be checked, entering a procedure of forward tracing batch number to generate and return a root node, after inputting the company code and the root node data again, confirming a category to which the node belonging, that being, batch number node, manufacturing batch number node, manufacturing order node, or client node, and recurring the confirmation result with a recursive loop, and returning the result.

B: Procedure of Forward Tracing Batch Number

Figure 3:
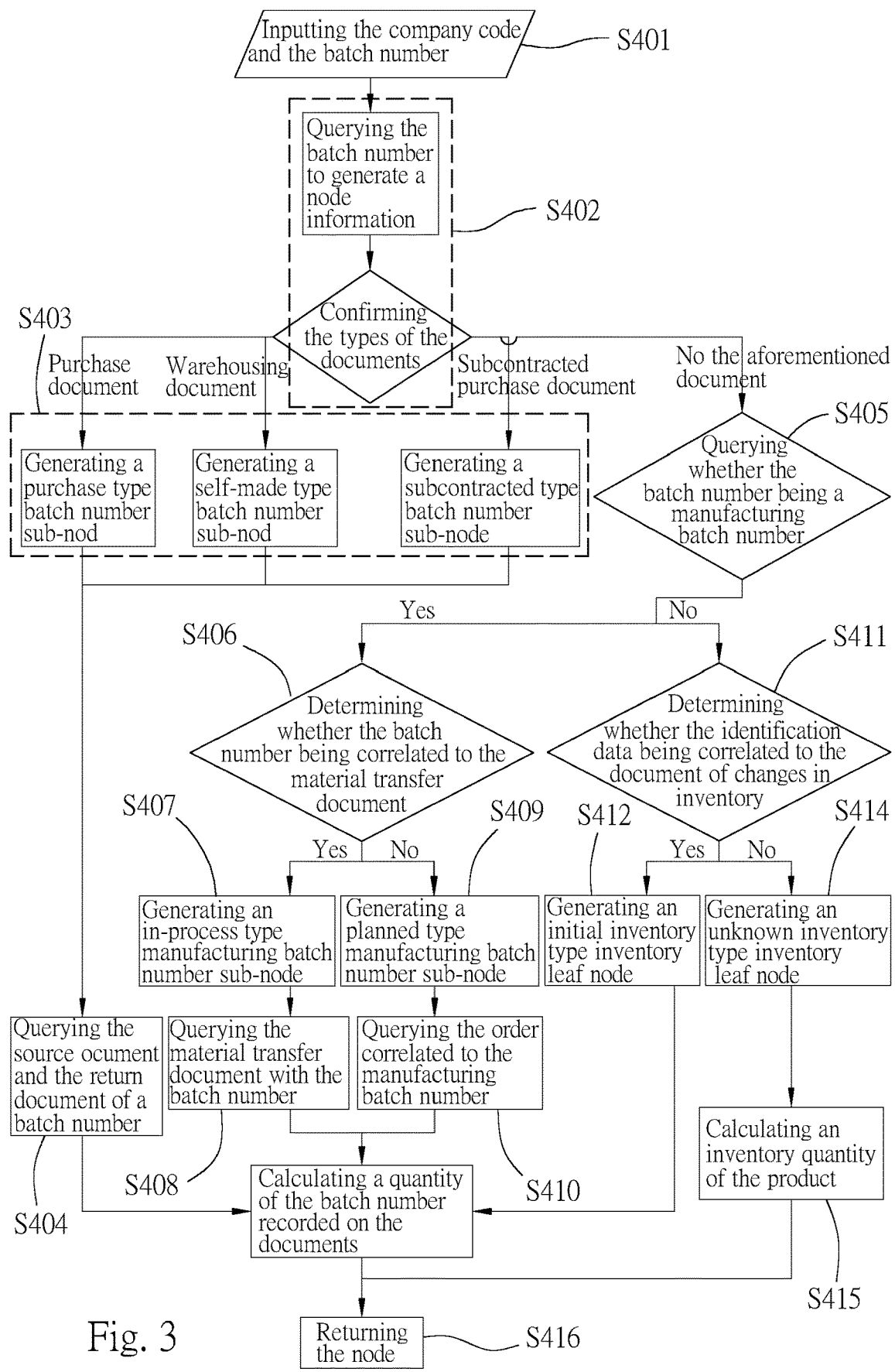
FIG. 3 is a flow chart of a procedure of forward tracing batch number according to a preferred embodiment of the invention.

As shown in FIG. 3, implementation steps of the procedure of forward tracing batch number are as follows:

step S401: inputting the company code to be checked and the batch number to be checked;

step S402: querying all the source documents matching the batch number to be checked, and confirming the types of the documents;

step S403: in step S402, when the source document being a purchase document, a warehousing document and/or a subcontracted purchase document, respectively generating a purchase type batch number sub-node, a self-made type batch number sub-node and/or a subcontracted type batch number sub-node;

step S404: querying the source document and the return document of a batch number, and calculating a quantity of the batch number to be checked recorded on the documents, in detail, the source document queried here being the same type as the source document in step S403, for example, the purchase type batch number sub-node only querying the purchase document and the return purchase document; the self-made type batch number sub-node only querying the warehousing document; the subcontracted type batch number sub-node only querying the subcontracted purchase document and the subcontracted return purchase document;

step S405: in step S402, when the source document being not a purchase document, a warehousing document and/or a subcontracted purchase document, querying whether the batch number to be checked being a manufacturing batch number;

step S406: in step S405, if the batch number to be checked being a manufacturing batch number, further determining whether the manufacturing batch number being correlated to the material transfer document in the database;

step S407: in step S406, if the material transfer document matching the manufacturing batch number existing in the database, generating an in-process type manufacturing batch number sub-node;

step S408: querying the material transfer document with the manufacturing batch number, and calculating a quantity of the batch number to be checked recorded on the documents;

step S409: in step S406, if the material transfer document matching the manufacturing batch number being not existing in the database, generating a planned type manufacturing batch number sub-node;

step S410: querying the source manufacturing order correlated to the manufacturing batch number, and calculating a quantity of other batch numbers to be checked correlated to the source manufacturing order;

step S411: in step S405, if the batch number to be checked being not a manufacturing batch number, determining whether the identification data being correlated to the document of changes in inventory;

step S412: in step S411, if the document of changes in inventory correlated to the identification data existing in the database, generating an initial inventory type inventory leaf node; and calculating a quantity of the batch number to be checked recorded on the document of changes in inventory;

step S414: in step S411, if the document of changes in inventory correlated to the identification data being not existing in the database, generating an unknown inventory type inventory leaf node;

step S415: calculating an inventory quantity of the product; and step S416: returning the traceability results of the foregoing steps.

C: Procedure of Forward Tracing Manufacturing Batch Number Node

Figure 4:
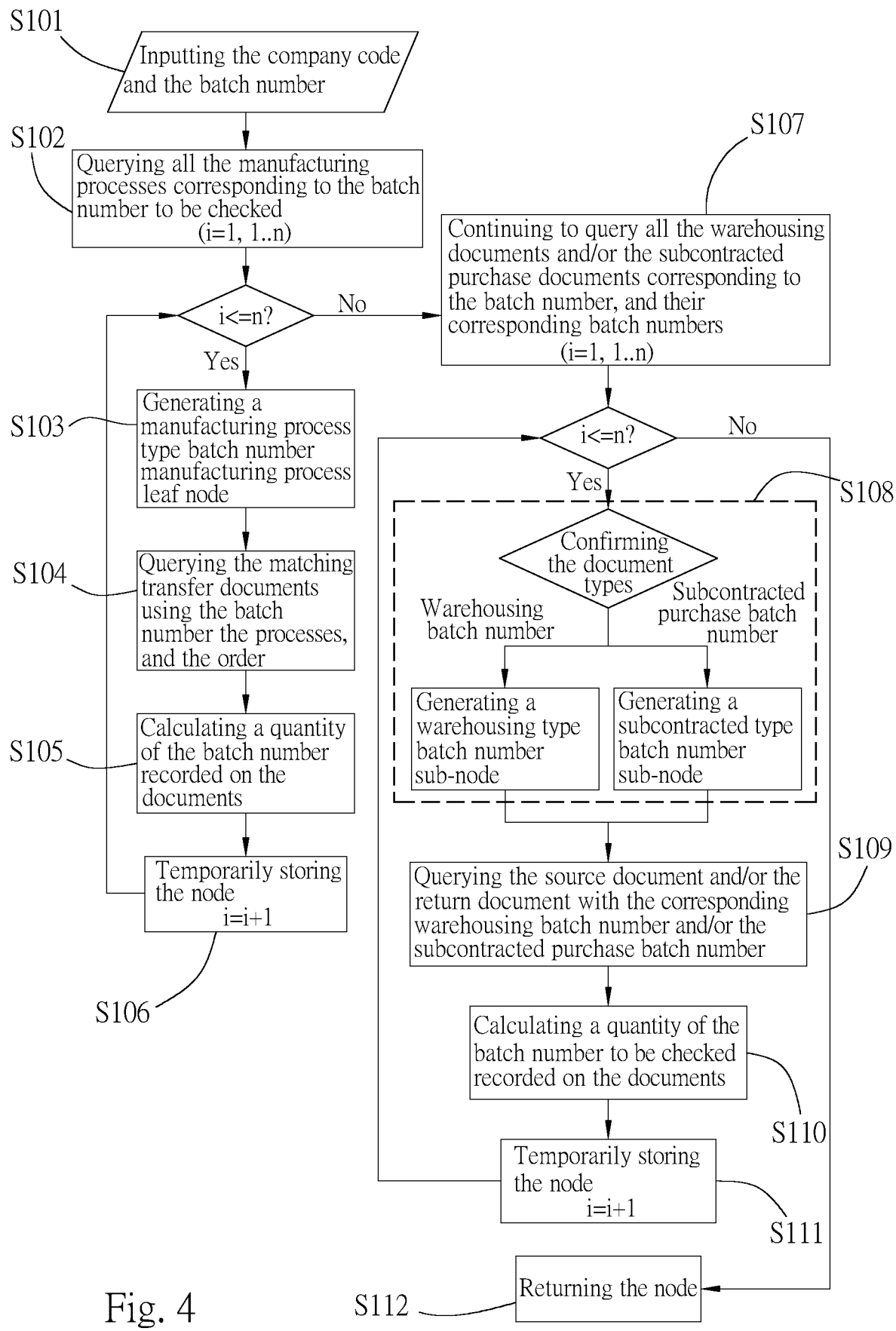
FIG. 4 is a flow chart of a procedure of forward tracing manufacturing batch number node according to a preferred embodiment of the invention.

As shown in FIG. 4, implementation steps of the procedure of forward tracing manufacturing batch number node are as follows:

step S101: inputting the company code to be checked and the batch number to be checked;

step S102: querying all the manufacturing processes corresponding to the batch number to be checked;

step S103: in step S102, if the manufacturing process matching the identification data existing in the database, the forward tracing module 43 generating a manufacturing process type batch number manufacturing process leaf node, the forward tracing module 43 further sorting according to the processes of the manufacturing process;

step S104: querying the matching transfer documents using the batch number to be checked, the processes obtained in step S103, and the source manufacturing order correlated to the batch number to be checked;

step S105: calculating a quantity of the batch number to be checked recorded on the transfer documents;

step S106: temporarily storing the node, and returning to step S102;

step S107: in step S102, after processing all the manufacturing processes matching the identification data, continuing to query all the warehousing documents and/or the subcontracted purchase documents corresponding to the batch number to be checked, and their corresponding batch numbers;

step S108: in step S107, if the warehousing documents and/or the subcontracted purchase documents matching the identification data existing in the database, confirming the document types, when the batch number to be checked being a warehousing batch number, its document type being the warehousing document, and generating a warehousing type batch number sub-node; when the batch number to be checked being a subcontracted purchase batch number, its document type being the subcontracted purchase document, and generating a subcontracted type batch number sub-node;

step S109: querying the source document and/or the return document with the corresponding warehousing batch number and/or the subcontracted purchase batch number, in detail, the source document queried here being the same type as the document type in step S108, for example, the warehousing type batch number sub-node only querying the warehousing document; the subcontract type batch number sub-node only querying the subcontracted purchase document and the subcontracted return purchase document;

step S110: calculating a quantity of the batch number to be checked recorded on the warehousing documents and/or the subcontracted purchase documents, the subcontracted return purchase document;

step S111: temporarily storing the nodes, and returning to step S107; and step S112: in step S107, after processing all the warehousing documents and/or the subcontracted purchase documents matching the identification data, returning the traceability results.

D: Procedure of Forward Tracing Batch Number Node

Figure 5:
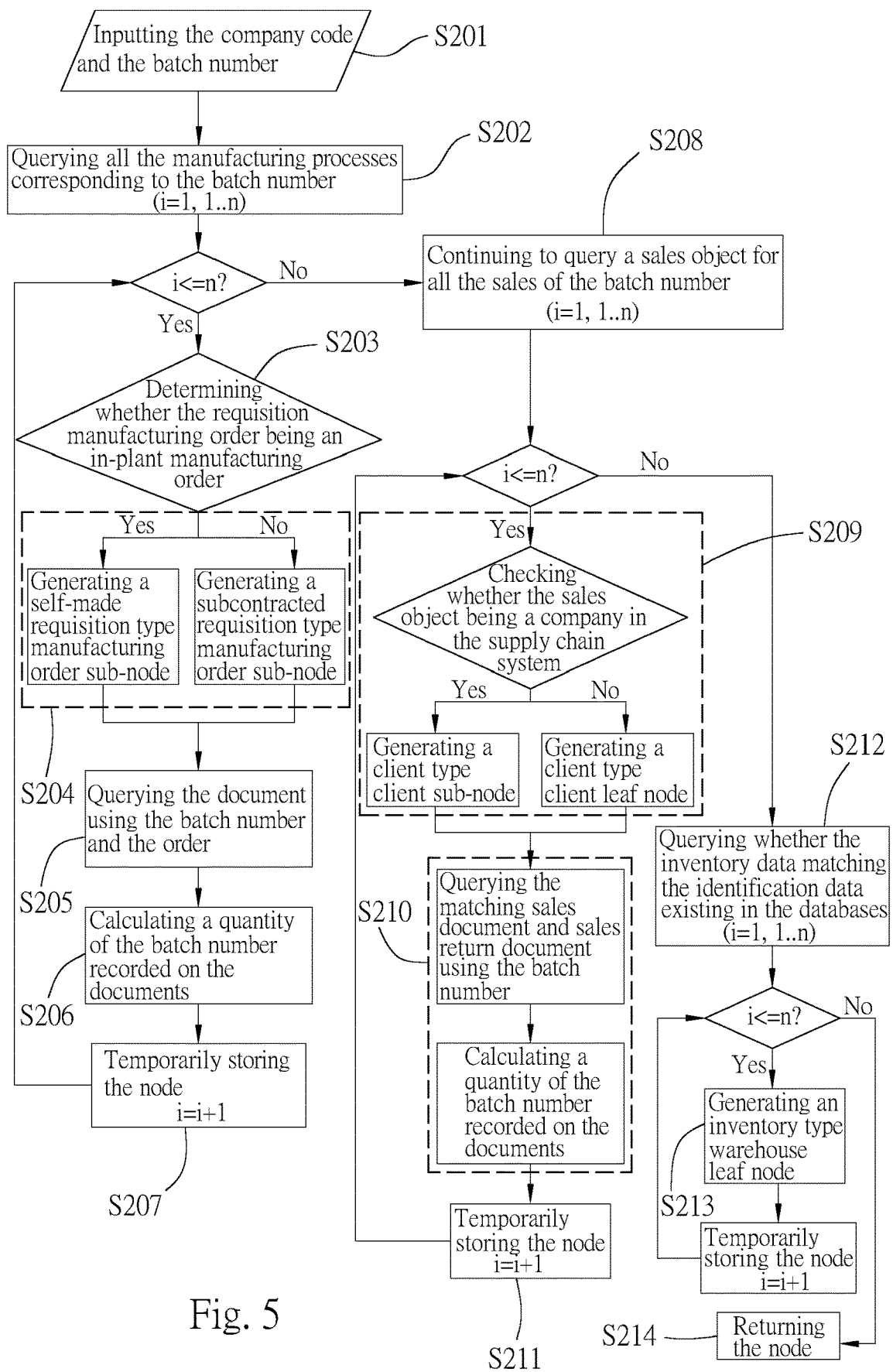
FIG. 5 is a flow chart of a procedure of forward tracing batch number node according to a preferred embodiment of the invention.

As shown in FIG. 5, implementation steps of the procedure of forward tracing batch number node are as follows:

step S201: inputting the company code to be checked and the batch number to be checked;

step S202: querying all the requisition manufacturing orders requisitioning the batch number to be checked;

step S203: in step S202, when the matching requisition manufacturing order being found, determining whether the requisition manufacturing order being an in-plant manufacturing order or a subcontracted manufacturing order;

step S204: in step S203, when the requisition manufacturing order being the in-plant manufacturing order, the forward tracing module 43 generating a self-made requisition type manufacturing order sub-node; when the requisition manufacturing order being the subcontracted manufacturing order, the forward tracing module 43 generating a subcontracted requisition type manufacturing order sub-node;

step S205: querying the matching source document and return document using the requisition batch number and the requisition manufacturing order obtained in step S203, in detail, the source document queried here being determined according to the document type in step S203, for example, the self-made requisition type manufacturing order sub-node only querying the material requisition document; the subcontracted requisition type manufacturing order sub-node only querying the subcontracted purchase document;

step S206: calculating a quantity of the batch number to be checked recorded on the source document and the return document;

step S207: temporarily storing the nodes, and returning to step S202;

step S208: in step S202, after processing all the requisition manufacturing orders corresponding to the batch number to be checked, continuing to query a sales object for all the sales of the batch number to be checked;

step S209: checking whether the sales object being a company in the supply chain system, in detail, in step S208, when the sales object being found, determining whether the sales object being a company role, when the determined result being yes, the forward tracing module 43 generating a client type client sub-node; when the determined result being no, the forward tracing module 43 generating a client type client leaf node;

step S210: querying the matching sales document and sales return document using the batch number to be checked and the results obtained in step S209, and calculating a quantity of the batch number to be checked recorded on the documents;

step S211: temporarily storing the node, and returning to step S208;

step S212: in step S208, after processing all the sales objects matching the identification data, further querying whether the inventory data matching the identification data existing in the databases;

step S213: in step S212, if the inventory data matching the identification data existing in the databases, generating an inventory type warehouse leaf node, reading the inventory data, and calculating a quantity of the inventory data; and step S214: in step S212, after processing all the inventory data matching the identification data, returning the traceability results of the foregoing steps.

E: Procedure of Forward Tracing Manufacturing Order Node

Figure 6:
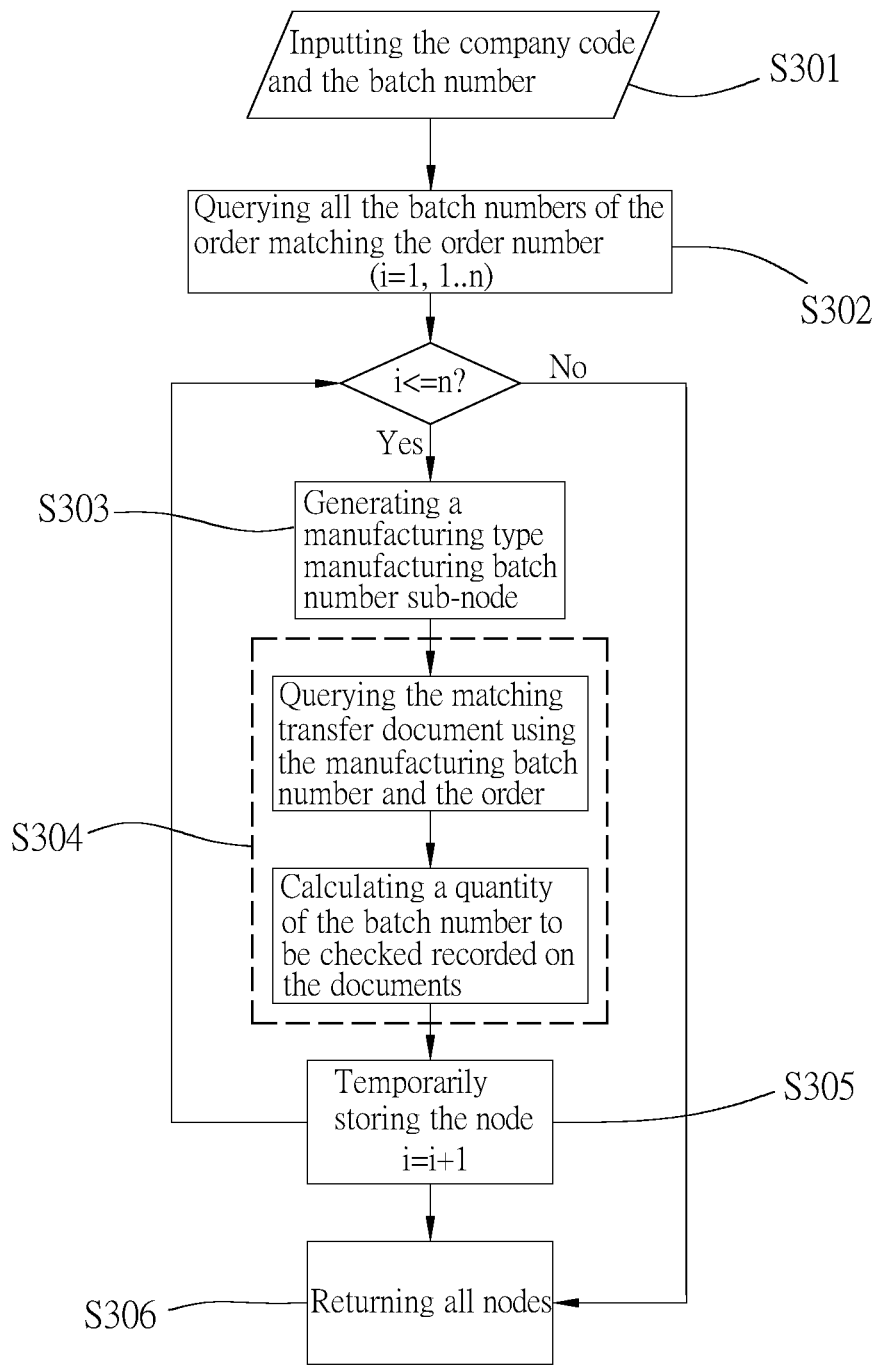
FIG. 6 is a flow chart of a procedure of forward tracing manufacturing order node according to a preferred embodiment of the invention.

As shown in FIG. 6, implementation steps of the procedure of forward tracing manufacturing order node are as follows:

step S301: inputting the company code to be checked and the order number to be checked;

step S302: querying all the correlated manufacturing batch numbers of the manufacturing order matching the order number to be checked;

step S303: in step S302, if the manufacturing batch number matching the identification data existing in the database, generating a manufacturing type manufacturing batch number sub-node;

step S304: querying the matching transfer document using the manufacturing batch number and the source manufacturing order correlated to the manufacturing batch number, and calculating a quantity of the batch number to be checked recorded on the documents;

step S305: temporarily storing the node, and returning to step S302; and step S306: in step S302, after processing all the manufacturing batch numbers matching the identification data, returning the traceability results.

As shown in FIGS. 7 to 11, the retrospective tracing module 42 is capable of executing the following procedures:

A: Node Classification Confirmation Procedure

Figure 7:
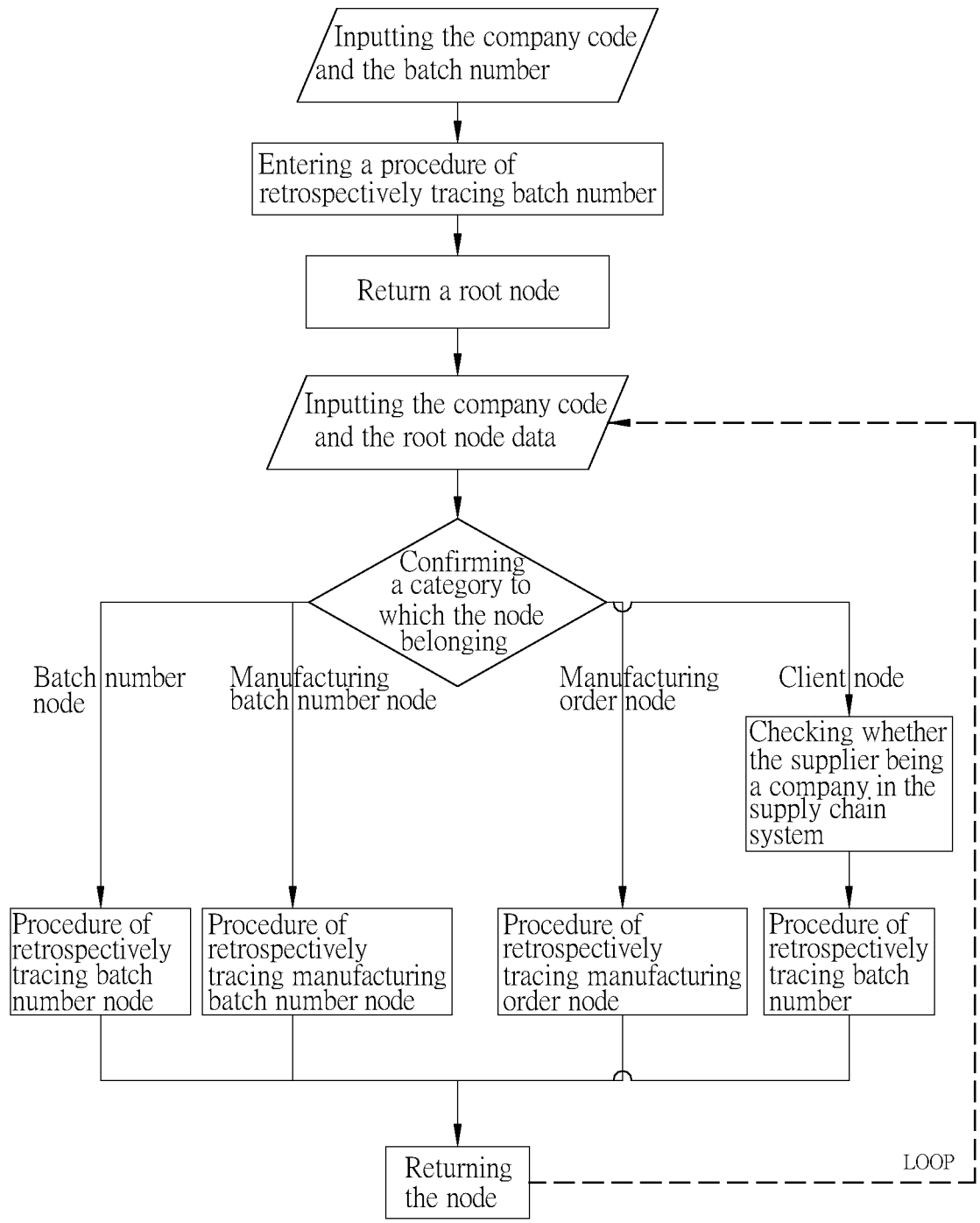
FIG. 7 is a flow chart of a root node procedure and a node classification confirmation procedure executed by a retrospective tracing module according to a preferred embodiment of the invention.

As shown in FIG. 7, based on the company code to be checked and/or the batch number to be checked, entering a procedure of retrospectively tracing batch number to generate and return a root node, after inputting the company code and the root node data again, confirming a category to which the node belonging, that being, batch number node, manufacturing batch number node, manufacturing order node, or supplier node, and recurring the confirmation results with a recursive loop, and returning the results.

B: Procedure of Retrospectively Tracing Batch Number

Figure 8:
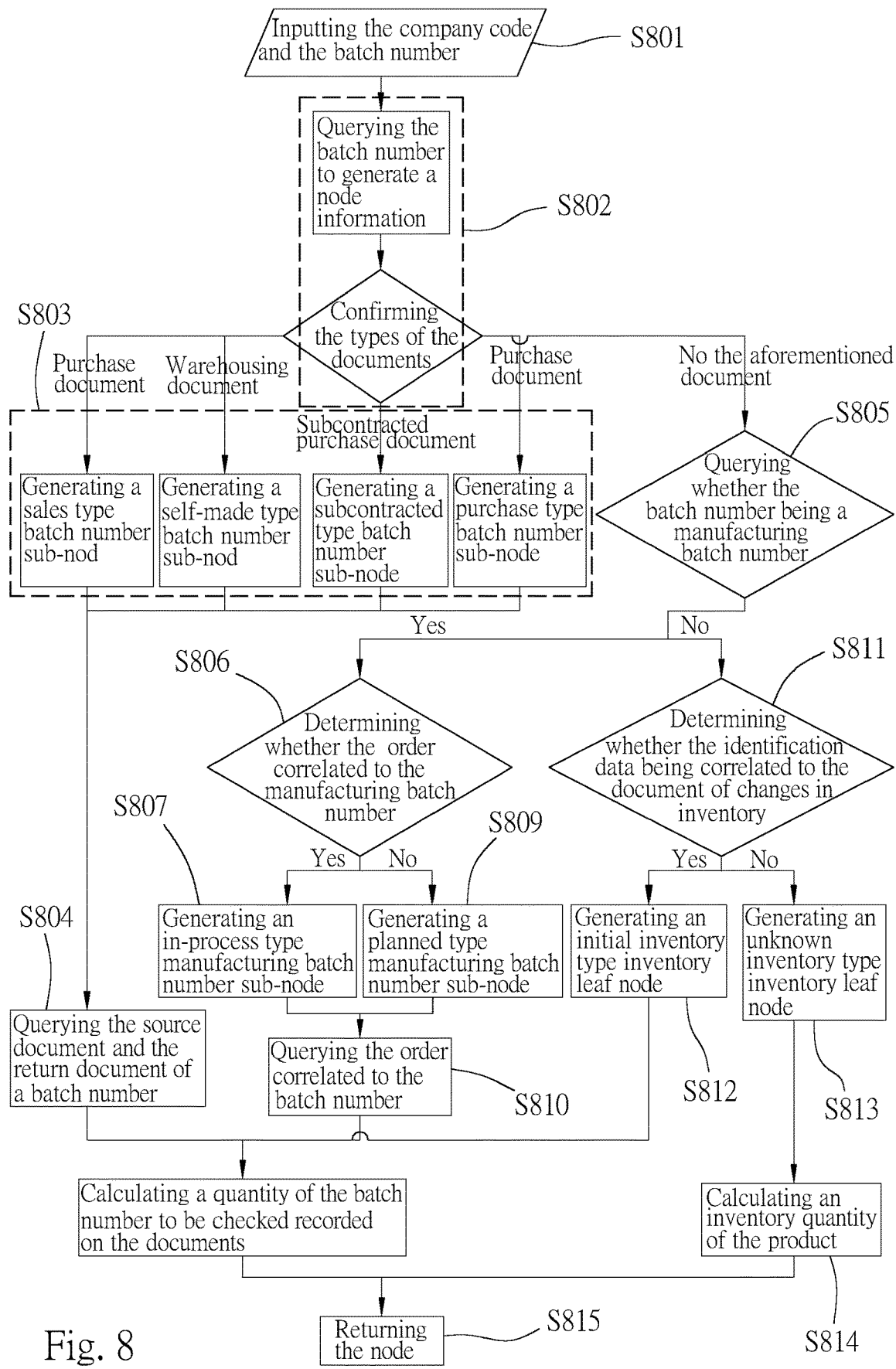
FIG. 8 is a flow chart of a procedure of retrospectively tracing batch number according to a preferred embodiment of the invention.

As shown in FIG. 8, implementation steps of the procedure of retrospectively tracing batch number are as follows:

step S801: inputting the company code to be checked and the batch number to be checked;

step S802: querying all the source documents matching the batch number to be checked, and determining the types of the source documents, that being, determining the types of the source documents by querying whether each document data having a correlated batch number to be checked;

step S803: in step S802, when the source document being a sales document, a warehousing document, a subcontracted purchase document and/or a purchase document, respectively generating a sales type batch number sub-node, a self-made type batch number sub-node, a subcontracted type batch number sub-node and/or a purchase type batch number sub-node;

step S804: querying the source document and the return document of the batch number, and calculating a quantity of the batch number to be checked recorded on the documents, in detail, the source document queried here being the same type as the source document in step S803, for example, the sales type batch number sub-node only querying the sales document and the sales return document; the self-made type batch number sub-node only querying the warehousing document; the subcontracted type batch number sub-node only querying the subcontracted purchase document and the subcontracted return purchase document; the purchase type batch number sub-node only querying the purchase document and the return purchase document;

step S805: in step S802, when the source document being not a sales document, a warehousing document, a subcontracted purchase document and/or a purchase document, querying whether the batch number to be checked being a manufacturing batch number;

step S806: in step S805, if the batch number to be checked being a manufacturing batch number, further determining whether the source manufacturing order correlated to the manufacturing batch number being correlated to the transfer document in the database;

step S807: in step S806, if the transfer document matching the source manufacturing order correlated to the manufacturing batch number existing in the database, generating an in-process type manufacturing batch number sub-node;

step S809: in step S806, if the transfer document matching the source manufacturing order correlated to the manufacturing batch number being not existing in the database, generating a planned type manufacturing batch number sub-node;

step S810: continuing after step S807 or step S809, querying the source manufacturing order matching the manufacturing batch number, and calculating a quantity of the source manufacturing order;

step S811: in step S805, if the batch number being not a manufacturing batch number, determining whether the identification data being correlated to the document of changes in inventory;

step S812: in step S811, if the document of changes in inventory correlated to the identification data existing in the database, generating an initial inventory type inventory leaf node; and querying the document of changes in inventory of the batch number, and calculating a quantity of the batch number to be checked recorded on the document;

step S813: in step S811, if the document of changes in inventory correlated to the identification data being not existing in the database, generating an unknown inventory type inventory leaf node;

step S814: calculating an inventory quantity of the product; and step S815: returning the traceability results of the foregoing steps.

C: Procedure of Retrospectively Tracing Batch Number Node

Figure 9:
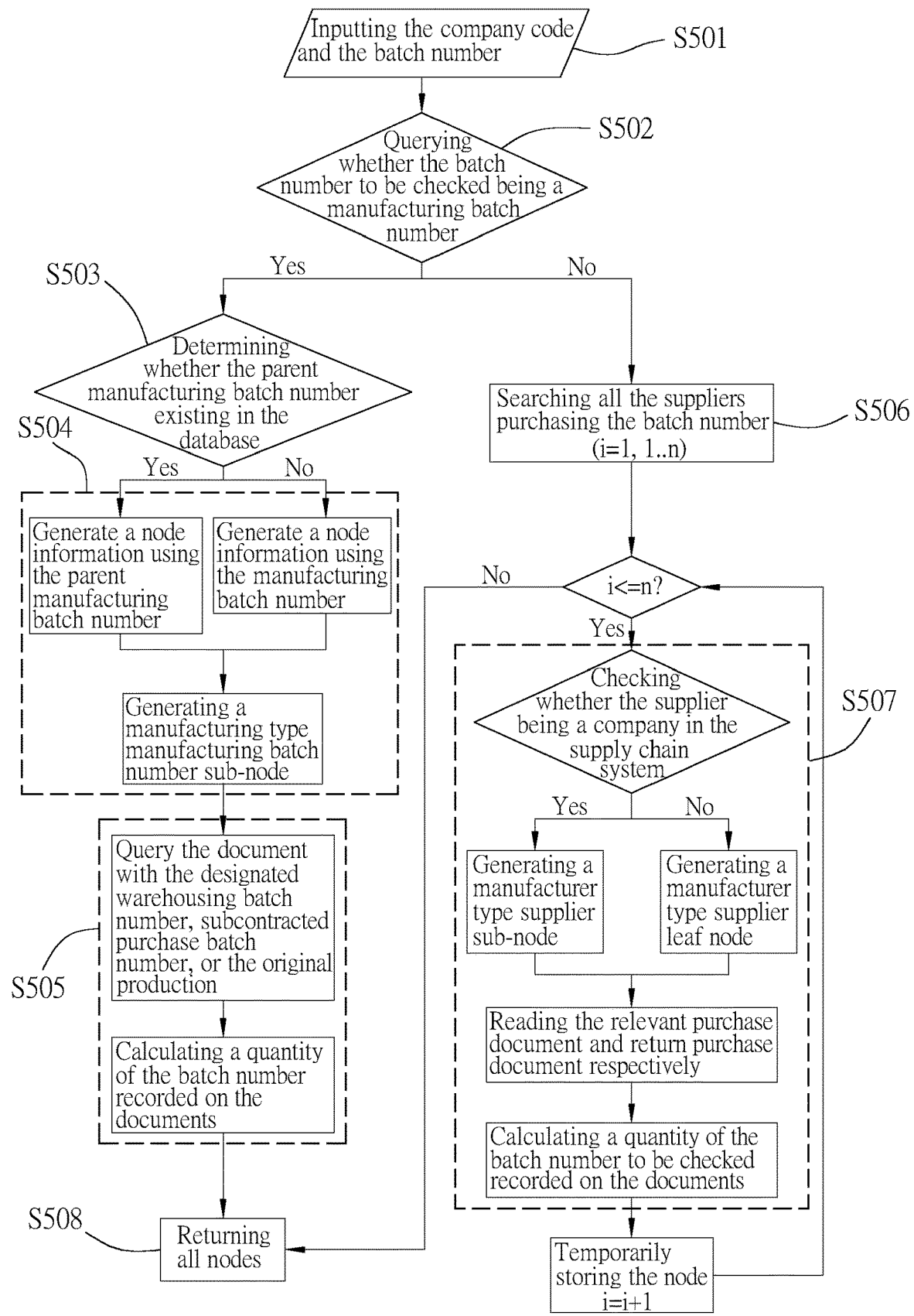
FIG. 9 is a flow chart of a procedure of retrospectively tracing batch number node according to a preferred embodiment of the invention.

As shown in FIG. 9, implementation steps of the procedure of retrospectively tracing batch number node are as follows:

step S501: inputting the company code to be checked and the batch number to be checked;

step S502: querying whether the batch number to be checked being a manufacturing batch number;

step S503: in step S502, if the identification data being a manufacturing batch number, further determining whether the parent manufacturing batch number matching the manufacturing batch number existing in the database;

step S504: if the parent manufacturing batch number matching the manufacturing batch number existing in the database, generating a manufacturing type manufacturing batch number sub-node using the parent manufacturing batch number; if the parent manufacturing batch number matching the manufacturing batch number being not existing in the database, generating a manufacturing type manufacturing batch number sub-node using the manufacturing batch number;

step S505: querying the designated warehousing batch number/subcontracted purchase batch number, the source document of the source manufacturing order of original production, and the return document, in detail, using the manufacturing batch number used to generate the node in step S504, and the parent manufacturing batch number or the manufacturing batch number correlated to the source manufacturing order of original production to query the matching source documents, and calculating a quantity of the batch number to be checked recorded on the source documents;

step S506: searching all the suppliers purchasing the batch number to be checked, in detail, in step S502, if the identification data being not a manufacturing batch number, querying whether a supply object matching the identification data existing in the database;

step S507: checking whether the supplier being a company in the supply chain system, in detail, in step S506, if the supply object matching the identification data existing in the database, determining whether the supply object being a company role, when the supply object being a company role, generating a manufacturer type supplier sub-node, and further executing other supply chain traceability operations; when the supply object being not a company role, generating a manufacturer type supplier leaf node;

then, reading the relevant purchase document and return purchase document respectively, and calculating a quantity of the batch number to be checked recorded on the documents; and step S508: after step S505 or in step S506, after processing all the supply objects matching the identification data, returning the traceability results of the foregoing steps.

D: Procedure of Retrospectively Tracing Manufacturing Batch Number Node

Figure 10:
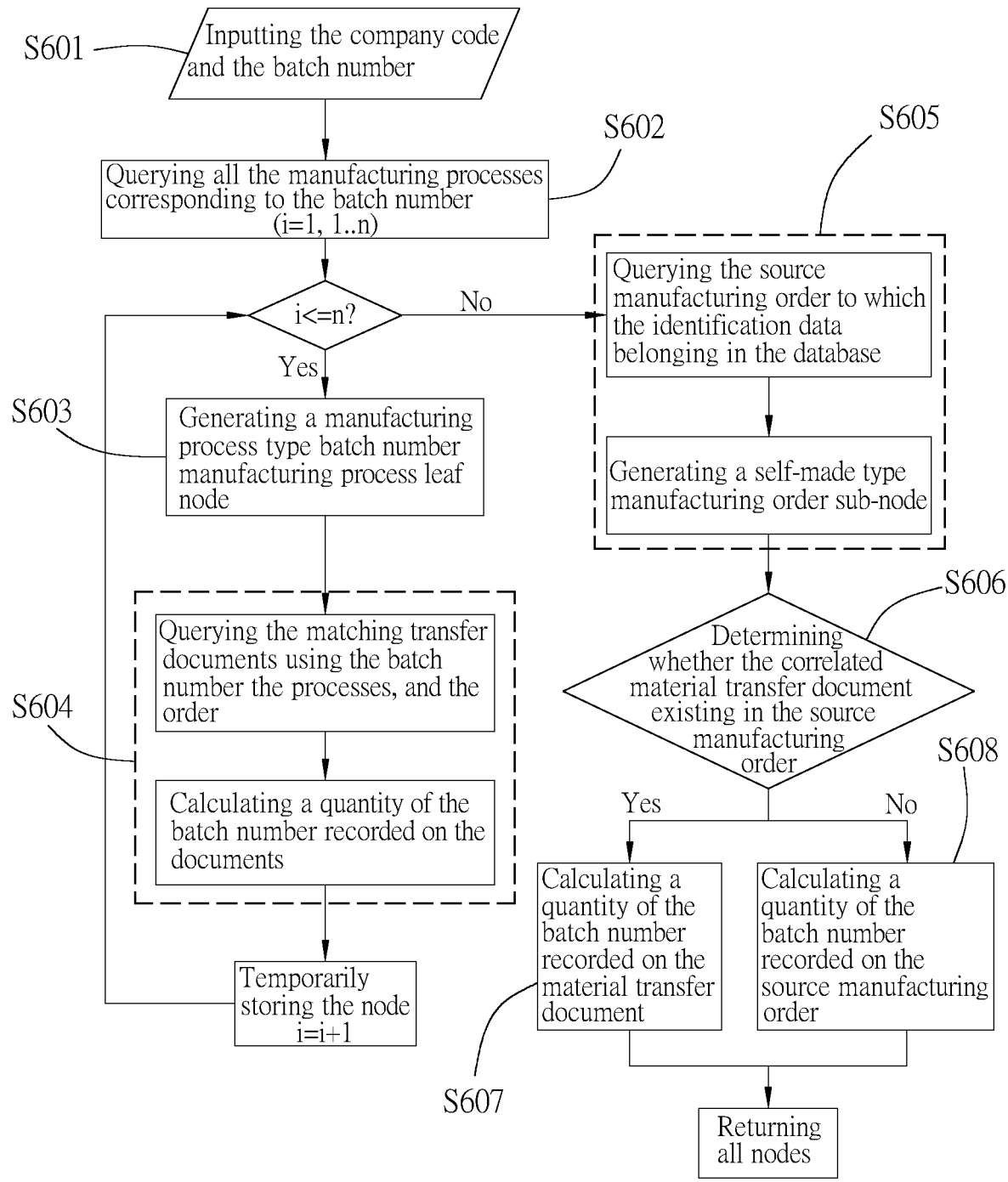
FIG. 10 is a flow chart of a procedure of retrospectively tracing manufacturing batch number node according to a preferred embodiment of the invention.

As shown in FIG. 10, implementation steps of the procedure of retrospectively tracing manufacturing batch number node are as follows:

step S601: inputting the company code to be checked and the batch number to be checked;

step S602: querying all the manufacturing processes of the batch number to be checked;

step S603: in step S602, if the manufacturing process matching the identification data existing in the database, generating a manufacturing process type batch number manufacturing process leaf node, furthermore, the retrospective tracing module 42 further sorting according to the processes of the manufacturing process;

step S604: querying the matching transfer documents using the batch number to be checked, the processes obtained in step S603, and the source manufacturing order correlated to the batch number to be checked, and calculating a quantity of the batch number to be checked recorded on the transfer documents;

step S605: in step S602, after processing all the manufacturing processes matching the identification data, querying the source manufacturing order to which the identification data belonging in the database, and generating a self-made type manufacturing order sub-node;

step S606: determining whether the correlated material transfer document existing in the source manufacturing order;

step S607: in step S606, when the correlated material transfer document existing in the source manufacturing order, calculating a quantity of the batch number to be checked recorded on the material transfer document; and step S608: in step S606, when the correlated material transfer document being not existing in the source manufacturing order, calculating a quantity of the batch number to be checked recorded on the source manufacturing order.

E: Procedure of Retrospectively Tracing Manufacturing Order Node

Figure 11:
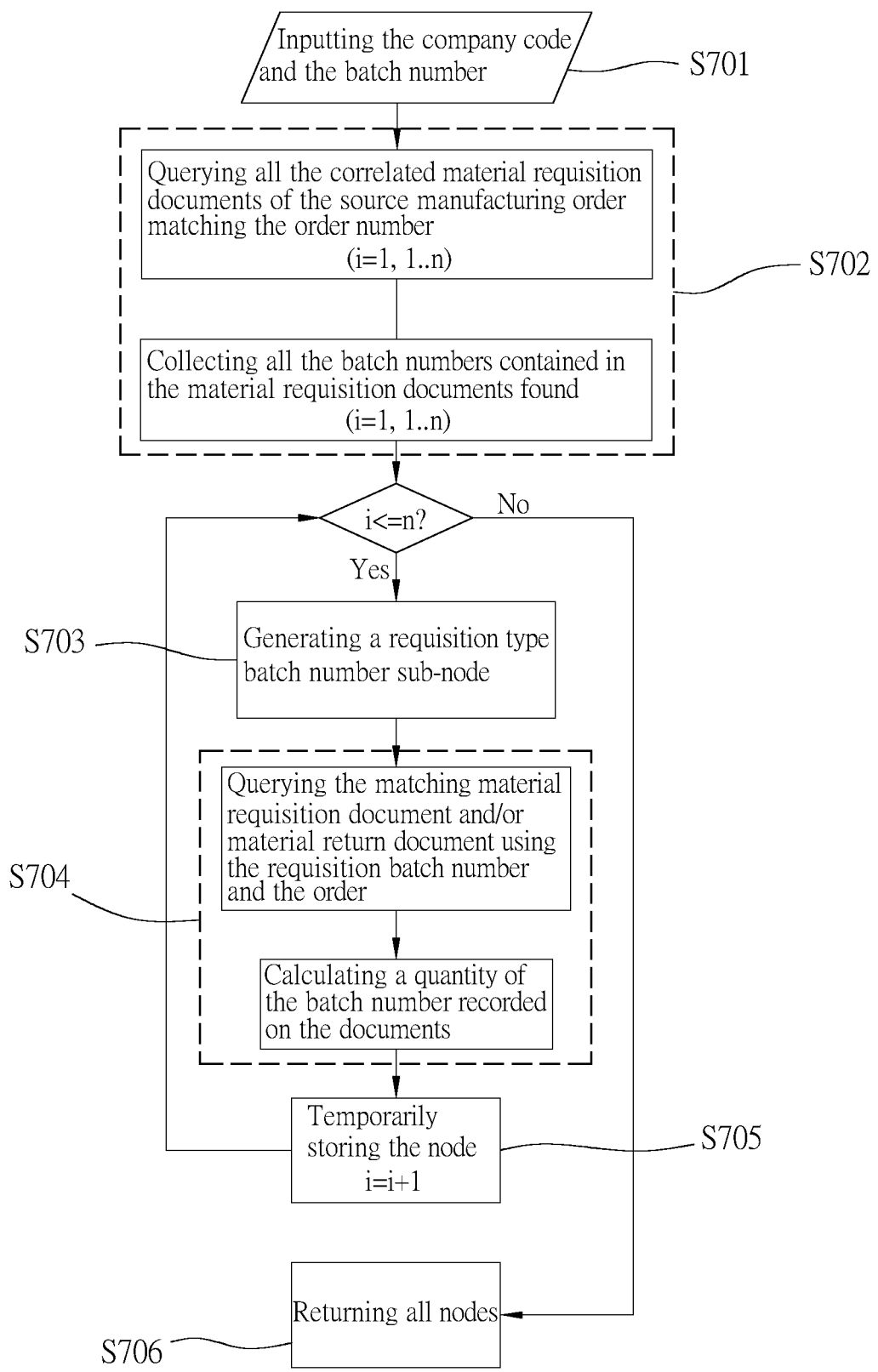
FIG. 11 is a flow chart of a procedure of retrospectively tracing manufacturing order node according to a preferred embodiment of the invention.

As shown in FIG. 11, implementation steps of the procedure of retrospectively tracing manufacturing order node are as follows:

step S701: inputting the company code to be checked and the order number to be checked;

step S702: querying all the correlated material requisition documents of the source manufacturing order matching the order number to be checked, and collecting all the batch numbers contained in the material requisition documents found;

step S703: in step S702, if the material requisition document and the requisition batch number correlated to the identification data existing in the database, generating a requisition type batch number sub-node;

step S704: querying the matching material requisition document and/or material return document using the requisition batch number obtained in step S703 and the source manufacturing order correlated to the requisition batch number, and calculating a quantity of the order number to be checked recorded on the documents;

step S705: temporarily storing the node, and returning to step S702; and step S706: in step S702, after processing all the material requisition documents and the requisition batch numbers correlated to the identification data, returning the traceability results.

In addition, the sub-nodes and the leaf nodes respectively established by the retrospective tracing module 42 and the forward tracing module 43 respectively establish a connection relationship with the traceability node. Each of the procedures disclosed above is only a representative example to illustrate the functions of the preferred embodiment of the invention, it does not mean that the preferred embodiment is only capable of performing the traceability methods listed above, nor does it mean that there is a certain order of execution among the various procedures.

Accordingly, the user is capable of using the traceability nodes, the sub-nodes and/or the leaf nodes obtained through mathematical operation to quickly search for the cross-plant/site data to be queried and to be used as a basis for judging food safety.

The resource management system 50 is used for water resource management and reuse, green energy management, agricultural waste or sewage treatment. In this embodiment, the resource management system 50 comprises a water purification and recovery device and a green energy device. The water purification and recovery device is used to filter and/or remove pollutants such as fish manure in the water, and make it into fertilizer, and the filtered water is recycled to reduce waste of resources. The green energy device can be used with an artificial intelligence (AI) solar energy storage system to store electricity during off-peak hours to reduce electricity costs.

It is to be understood that the above description is only the embodiment of the invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. A traceability management method for supply chains of agricultural, fishery and animal husbandry products, comprising steps of:

receiving an identification data representing a product by utilizing a computing device or a server for receiving the identification data, the computing device is selected from a group comprising a desktop computer, a notebook computer, a smart phone or a tablet computer;

searching for at least one first data, second data and/or third data matching the identification data from one database or a plurality of databases of a platform, the one database or the plurality of databases of the platform is constructed with computer programs and stored in the computing device or the server, the database communicating with a production and marketing management system, a production monitoring system, a supply chain traceability and product footprint management system, and a resource management system of the platform; and utilizing the computing device or the server and performing correlated recursive mathematical operation on the first data, the second data, and/or the third data to search for and establish a traceability node having connection relationship with the first data, the second data and/or the third data;

wherein the identification data comprises a company code to be checked, a batch number to be checked, and an order number to be checked;

wherein the first data comprises a company code data and an inventory data;

wherein the second data comprises a source document and a return document, the source document comprises purchase document, material requisition document, subcontracted purchase document, delivery document, sales document, warehousing document, transfer document, material transfer document, and document of changes in inventory, the return document comprises return purchase document, material return document, subcontracted return purchase document, and sales return document;

wherein the database further comprises the third data, the third data comprises source manufacturing order, requisition manufacturing order, and batch number manufacturing process data, the batch number manufacturing process data comprises process, manufacturing process, manufacturing batch number, parent manufacturing batch number, and requisition batch number, the source document and the return document record the first data and/or the third data, respectively;

wherein in the step of establishing the traceability node by mathematical operation, a procedure of forward tracing batch number is used to trace a flow direction of the product, and the procedure of forward tracing batch number comprises following steps of:

step a1: querying all the source documents matching the batch number to be checked;

step a2: when the source document being a purchase document, a warehousing document and/or a subcontracted purchase document, respectively generating a purchase type batch number sub-node, a self-made type batch number sub-node and/or a subcontracted type batch number sub-node, and respectively calculating a quantity of the batch number recorded on the corresponding source document;

step a3: when the source document being not a purchase document, a warehousing document and/or a subcontracted purchase document, querying whether the batch number to be checked being a manufacturing batch number;

step a4: in step a3, if the batch number to be checked being a manufacturing batch number, further determining whether the manufacturing batch number being correlated to the material transfer document in the database;

step a5: in step a4, if the material transfer document matching the manufacturing batch number existing in the database, generating an in-process type manufacturing batch number sub-node, and querying the material transfer document with the manufacturing batch number, and calculating a quantity of the batch number to be checked recorded on the material transfer document;

step a6: in step a4, if the material transfer document matching the manufacturing batch number being not existing in the database, generating a planned type manufacturing batch number sub-node, reading the source manufacturing order correlated to the manufacturing batch number in each of the databases, and calculating a quantity of other batch numbers to be checked correlated to the source manufacturing order;

step a7: in step a3, if the batch number to be checked being not a manufacturing batch number, determining whether the identification data being correlated to the document of changes in inventory; and step a8: in step a7, if the document of changes in inventory correlated to the identification data existing in the database, generating an initial inventory type inventory leaf node, and calculating a quantity of the batch number to be checked recorded on the document of changes in inventory; if the document of changes in inventory correlated to the identification data being not existing in the database, generating an unknown inventory type inventory leaf node, and calculating an inventory quantity of the product;

wherein, the purchase type batch number sub-node, the self-made type batch number sub-node, the subcontracted type batch number sub-node, the in-process type manufacturing batch number sub-node, the planned type manufacturing batch number sub-node, the initial inventory type inventory leaf node, and the unknown inventory type inventory leaf node respectively establish a connection relationship with the traceability node.

2. A traceability management method for supply chains of agricultural, fishery and animal husbandry products, comprising steps of:

receiving an identification data representing a product by utilizing a computing device or a server for receiving the identification data, the computing device is selected from a group comprising a desktop computer, a notebook computer, a smart phone or a tablet computer;

searching for at least one first data, second data and/or third data matching the identification data from one database or a plurality of databases of a platform, the one database or the plurality of databases of the platform is constructed with computer programs and stored in the computing device or the server, the database communicating with a production and marketing management system, a production monitoring system, a supply chain traceability and product footprint management system, and a resource management system of the platform; and utilizing the computing device or the server and performing correlated recursive mathematical operation on the first data, the second data, and/or the third data to search for and establish a traceability node having connection relationship with the first data, the second data and/or the third data;

wherein the identification data comprises a company code to be checked, a batch number to be checked, and an order number to be checked;

wherein the first data comprises a company code data and an inventory data;

wherein the second data comprises a source document and a return document, the source document comprises purchase document, material requisition document, subcontracted purchase document, delivery document, sales document, warehousing document, transfer document, material transfer document, and document of changes in inventory, the return document comprises return purchase document, material return document, subcontracted return purchase document, and sales return document;

wherein the database further comprises the third data, the third data comprises source manufacturing order, requisition manufacturing order, and batch number manufacturing process data, the batch number manufacturing process data comprises process, manufacturing process, manufacturing batch number, parent manufacturing batch number, and requisition batch number, the source document and the return document record the first data and/or the third data, respectively;

wherein in the step of establishing the traceability node by mathematical operation, a procedure of forward tracing manufacturing batch number node is used to trace a flow direction of the product, and the procedure of forward tracing manufacturing batch number node comprises following steps of:

step b1: querying whether the manufacturing process matching the identification data existing in the database;

step b2: in step b1, if the manufacturing process matching the identification data existing in the database, generating a manufacturing process type batch number manufacturing process leaf node, further sorting according to the processes of the manufacturing process; querying the matching transfer document using the batch number to be checked, the processes, and the source manufacturing order correlated to the batch number to be checked, and calculating a quantity of the batch number to be checked recorded on the transfer document;

step b3: in step b1, after processing all the manufacturing processes matching the identification data, querying whether the warehousing document and/or the subcontracted purchase document matching the identification data existing in the database;

step b4: in step b3, if the warehousing document and/or the subcontracted purchase document matching the identification data existing in the database, confirming the document types, and respectively generating a warehousing type batch number sub-node and/or a subcontracted type batch number sub-node, and calculating a quantity of the batch number to be checked recorded on the corresponding source document and/or return document; and step b5: in step b3, after processing all the warehousing documents and/or the subcontracted purchase documents matching the identification data, returning the traceability results;

wherein, the manufacturing process type batch number manufacturing process leaf node, the warehousing type batch number sub-node, and the subcontracted type batch number sub-node respectively establish a connection relationship with the traceability node.

3. A traceability management method for supply chains of agricultural, fishery and animal husbandry products, comprising steps of:

receiving an identification data representing a product by utilizing a computing device or a server for receiving the identification data, the computing device is selected from a group comprising a desktop computer, a notebook computer, a smart phone or a tablet computer;

searching for at least one first data, second data and/or third data matching the identification data from one database or a plurality of databases of a platform, the one database or the plurality of databases of the platform is constructed with computer programs and stored in the computing device or the server, the database communicating with a production and marketing management system, a production monitoring system, a supply chain traceability and product footprint management system, and a resource management system of the platform; and utilizing the computing device or the server and performing correlated recursive mathematical operation on the first data, the second data, and/or the third data to search for and establish a traceability node having connection relationship with the first data, the second data and/or the third data;

wherein the identification data comprises a company code to be checked, a batch number to be checked, and an order number to be checked;

wherein the first data comprises a company code data and an inventory data;

wherein the second data comprises a source document and a return document, the source document comprises purchase document, material requisition document, subcontracted purchase document, delivery document, sales document, warehousing document, transfer document, material transfer document, and document of changes in inventory, the return document comprises return purchase document, material return document, subcontracted return purchase document, and sales return document;

wherein the database further comprises the third data, the third data comprises source manufacturing order, requisition manufacturing order, and batch number manufacturing process data, the batch number manufacturing process data comprises process, manufacturing process, manufacturing batch number, parent manufacturing batch number, and requisition batch number, the source document and the return document record the first data and/or the third data, respectively;

wherein in the step of establishing the traceability node by mathematical operation, a procedure of forward tracing batch number node is used to trace a flow direction of the product, and the procedure of forward tracing batch number node comprises following steps of:

step c1: querying all the requisition manufacturing orders requisitioning the identification data;

step c2: continuing after step c1, if the requisition manufacturing order requisitioning the identification data existing in the database, determining the manufacturing order type, respectively generating a self-made requisition type manufacturing order sub-node or a subcontracted requisition type manufacturing order sub-node, respectively querying the source document and the return document matching the requisition manufacturing order, and calculating a quantity of the batch number to be checked recorded on the source document and the return document;

step c3: continuing after step c1, after processing all the requisition manufacturing orders requisitioning the identification data, querying whether a sales object matching the identification data existing in the database;

step c4: continuing after step c3, if the sales object matching the identification data existing in the database, determining whether the sales object being a company role, respectively generating a client type client sub-node or a client type client leaf node, querying the corresponding sales document and sales return document, and calculating a quantity of the batch number to be checked recorded on the sales document and the sales return document;

step c5: continuing after step c3, after processing all the sales objects matching the identification data, further querying whether the inventory data matching the identification data existing in the database; and step c6: continuing after step c5, if the inventory data matching the identification data existing in the database, generating an inventory type warehouse leaf node; if the inventory data matching the identification data being not existing in the database, returning the traceability results;

wherein, the self-made requisition type manufacturing order sub-node, the subcontracted requisition type manufacturing order sub-node, the client type client sub-node, the client type client leaf node, and the inventory type warehouse leaf node respectively establish a connection relationship with the traceability node.

4. A traceability management method for supply chains of agricultural, fishery and animal husbandry products, comprising steps of:

receiving an identification data representing a product by utilizing a computing device or a server for receiving the identification data, the computing device is selected from a group comprising a desktop computer, a notebook computer, a smart phone or a tablet computer;

searching for at least one first data, second data and/or third data matching the identification data from one database or a plurality of databases of a platform, the one database or the plurality of databases of the platform is constructed with computer programs and stored in the computing device or the server, the database communicating with a production and marketing management system, a production monitoring system, a supply chain traceability and product footprint management system, and a resource management system of the platform; and utilizing the computing device or the server and performing correlated recursive mathematical operation on the first data, the second data, and/or the third data to search for and establish a traceability node having connection relationship with the first data, the second data and/or the third data;

wherein the identification data comprises a company code to be checked, a batch number to be checked, and an order number to be checked;

wherein the first data comprises a company code data and an inventory data;

wherein the second data comprises a source document and a return document, the source document comprises purchase document, material requisition document, subcontracted purchase document, delivery document, sales document, warehousing document, transfer document, material transfer document, and document of changes in inventory, the return document comprises return purchase document, material return document, subcontracted return purchase document, and sales return document;

wherein the database further comprises the third data, the third data comprises source manufacturing order, requisition manufacturing order, and batch number manufacturing process data, the batch number manufacturing process data comprises process, manufacturing process, manufacturing batch number, parent manufacturing batch number, and requisition batch number, the source document and the return document record the first data and/or the third data, respectively;

wherein in the step of establishing the traceability node by mathematical operation, a procedure of forward tracing manufacturing order node is used to trace a flow direction of the product, and the procedure of forward tracing manufacturing order node comprises following steps of:

step d1: querying whether the manufacturing batch number matching the identification data existing in the database; and step d2: in step d1, if the manufacturing batch number matching the identification data existing in the database, generating a manufacturing type manufacturing batch number sub-node, querying the matching transfer document using the manufacturing batch number and the source manufacturing order correlated to the manufacturing batch number, and calculating a quantity of the batch number to be checked recorded on the transfer document; after processing all the manufacturing batch numbers matching the identification data, returning the traceability results;

wherein, the manufacturing type manufacturing batch number sub-node establishes a connection relationship with the traceability node.

5. A traceability management method for supply chains of agricultural, fishery and animal husbandry products, comprising steps of:

receiving an identification data representing a product by utilizing a computing device or a server for receiving the identification data, the computing device is selected from a group comprising a desktop computer, a notebook computer, a smart phone or a tablet computer;

searching for at least one first data, second data and/or third data matching the identification data from one database or a plurality of databases of a platform, the one database or the plurality of databases of the platform is constructed with computer programs and stored in the computing device or the server, the database communicating with a production and marketing management system, a production monitoring system, a supply chain traceability and product footprint management system, and a resource management system of the platform; and utilizing the computing device or the server and performing correlated recursive mathematical operation on the first data, the second data, and/or the third data to search for and establish a traceability node having connection relationship with the first data, the second data and/or the third data;

wherein the identification data comprises a company code to be checked, a batch number to be checked, and an order number to be checked;

wherein the first data comprises a company code data and an inventory data;

wherein the second data comprises a source document and a return document, the source document comprises purchase document, material requisition document, subcontracted purchase document, delivery document, sales document, warehousing document, transfer document, material transfer document, and document of changes in inventory, the return document comprises return purchase document, material return document, subcontracted return purchase document, and sales return document;

wherein the database further comprises the third data, the third data comprises source manufacturing order, requisition manufacturing order, and batch number manufacturing process data, the batch number manufacturing process data comprises process, manufacturing process, manufacturing batch number, parent manufacturing batch number, and requisition batch number, the source document and the return document record the first data and/or the third data, respectively;

wherein in the step of establishing the traceability node by mathematical operation, a procedure of retrospectively tracing batch number node is used to trace a flow direction of the product, and the procedure of retrospectively tracing batch number node comprises following steps of:

step e1: querying whether the identification data being a manufacturing batch number;

step e2: in step e1, if the identification data being a manufacturing batch number, further determining whether the parent manufacturing batch number matching the manufacturing batch number existing in the database, generating a manufacturing type manufacturing batch number sub-node using the parent manufacturing batch number or the manufacturing batch number, querying the source document and the return document matching the batch number to be checked and the source manufacturing order correlated to the parent manufacturing batch number or the manufacturing batch number, and calculating a quantity of the batch number to be checked recorded on the source document and the return document;

step e3: in step e1, if the identification data being not a manufacturing batch number, querying whether a supply object matching the identification data existing in the database;

step e4: in step e3, if the supply object matching the identification data existing in the database, determining whether the supply object being a company role, and respectively generating a manufacturer type supplier sub-node or a manufacturer type supplier leaf node, reading the corresponding purchase document and return purchase document respectively, and calculating a quantity of the batch number to be checked recorded on the purchase document and the return purchase document; and step e5: after processing all the supply objects matching the identification data in step e2 or step e4, returning the traceability results;

wherein, the manufacturing type manufacturing batch number sub-node, the manufacturer type supplier sub-node, and the manufacturer type supplier leaf node respectively establish a connection relationship with the traceability node.

6. A traceability management method for supply chains of agricultural, fishery and animal husbandry products, comprising steps of:

receiving an identification data representing a product by utilizing a computing device or a server for receiving the identification data, the computing device is selected from a group comprising a desktop computer, a notebook computer, a smart phone or a tablet computer;

searching for at least one first data, second data and/or third data matching the identification data from one database or a plurality of databases of a platform, the one database or the plurality of databases of the platform is constructed with computer programs and stored in the computing device or the server, the database communicating with a production and marketing management system, a production monitoring system, a supply chain traceability and product footprint management system, and a resource management system of the platform; and utilizing the computing device or the server and performing correlated recursive mathematical operation on the first data, the second data, and/or the third data to search for and establish a traceability node having connection relationship with the first data, the second data and/or the third data;

wherein the identification data comprises a company code to be checked, a batch number to be checked, and an order number to be checked;

wherein the first data comprises a company code data and an inventory data;

wherein the second data comprises a source document and a return document, the source document comprises purchase document, material requisition document, subcontracted purchase document, delivery document, sales document, warehousing document, transfer document, material transfer document, and document of changes in inventory, the return document comprises return purchase document, material return document, subcontracted return purchase document, and sales return document;

wherein the database further comprises the third data, the third data comprises source manufacturing order, requisition manufacturing order, and batch number manufacturing process data, the batch number manufacturing process data comprises process, manufacturing process, manufacturing batch number, parent manufacturing batch number, and requisition batch number, the source document and the return document record the first data and/or the third data, respectively;

wherein in the step of establishing the traceability node by mathematical operation, a procedure of retrospectively tracing manufacturing order node is used to trace a flow direction of the product, and the procedure of retrospectively tracing manufacturing order node comprises following steps of:

step f1: querying whether the correlated material requisition documents of the source manufacturing order matching the identification data existing in the database, and collecting all the batch numbers contained in the material requisition documents found; and step f2: in step f1, if the material requisition document correlated to the identification data existing in the database, generating a requisition type batch number sub-node, reading the material requisition document and the material return document, calculating a quantity of the order number to be checked recorded on the material requisition document and the material return document; after processing all the material requisition documents correlated to the identification data, returning the traceability results;

wherein, the requisition type batch number sub-node establishes a connection relationship with the traceability node.

7. A traceability management method for supply chains of agricultural, fishery and animal husbandry products, comprising steps of:

receiving an identification data representing a product by utilizing a computing device or a server for receiving the identification data, the computing device is selected from a group comprising a desktop computer, a notebook computer, a smart phone or a tablet computer;

searching for at least one first data, second data and/or third data matching the identification data from one database or a plurality of databases of a platform, the one database or the plurality of databases of the platform is constructed with computer programs and stored in the computing device or the server, the database communicating with a production and marketing management system, a production monitoring system, a supply chain traceability and product footprint management system, and a resource management system of the platform; and utilizing the computing device or the server and performing correlated recursive mathematical operation on the first data, the second data, and/or the third data to search for and establish a traceability node having connection relationship with the first data, the second data and/or the third data;

wherein the identification data comprises a company code to be checked, a batch number to be checked, and an order number to be checked;

wherein the first data comprises a company code data and an inventory data;

wherein the second data comprises a source document and a return document, the source document comprises purchase document, material requisition document, subcontracted purchase document, delivery document, sales document, warehousing document, transfer document, material transfer document, and document of changes in inventory, the return document comprises return purchase document, material return document, subcontracted return purchase document, and sales return document;

wherein the database further comprises the third data, the third data comprises source manufacturing order, requisition manufacturing order, and batch number manufacturing process data, the batch number manufacturing process data comprises process, manufacturing process, manufacturing batch number, parent manufacturing batch number, and requisition batch number, the source document and the return document record the first data and/or the third data, respectively;

wherein in the step of establishing the traceability node by mathematical operation, a procedure of retrospectively tracing manufacturing batch number node is used to trace raw materials and batch numbers of the product, and the procedure of retrospectively tracing manufacturing batch number node comprises following steps of:

step g1: querying whether the manufacturing process matching the identification data existing in the database;

step g2: in step g1, if the manufacturing process matching the identification data existing in the database, generating a manufacturing process type batch number manufacturing process leaf node, reading the transfer document, and calculating a quantity of the batch number to be checked recorded on the transfer document;

step g3: in step g1, after processing all the manufacturing processes matching the identification data, querying the source manufacturing order to which the identification data belonging in the database, and generating a self-made type manufacturing order sub-node; then, further determining whether the correlated material transfer document existing in the source manufacturing order; and step g4: in step g3, when the correlated material transfer document existing in the source manufacturing order, calculating a quantity of the batch number to be checked recorded on the material transfer document; when the correlated material transfer document being not existing in the source manufacturing order, calculating a quantity of the batch number to be checked recorded on the source manufacturing order;

wherein, the manufacturing process type batch number manufacturing process leaf node and the self-made type manufacturing order sub-node respectively establish a connection relationship with the traceability node.

8. A traceability management method for supply chains of agricultural, fishery and animal husbandry products, comprising steps of:

receiving an identification data representing a product by utilizing a computing device or a server for receiving the identification data, the computing device is selected from a group comprising a desktop computer, a notebook computer, a smart phone or a tablet computer;

searching for at least one first data, second data and/or third data matching the identification data from one database or a plurality of databases of a platform, the one database or the plurality of databases of the platform is constructed with computer programs and stored in the computing device or the server, the database communicating with a production and marketing management system, a production monitoring system, a supply chain traceability and product footprint management system, and a resource management system of the platform; and utilizing the computing device or the server and performing correlated recursive mathematical operation on the first data, the second data, and/or the third data to search for and establish a traceability node having connection relationship with the first data, the second data and/or the third data;

wherein the identification data comprises a company code to be checked, a batch number to be checked, and an order number to be checked;

wherein the first data comprises a company code data and an inventory data;

wherein the second data comprises a source document and a return document, the source document comprises purchase document, material requisition document, subcontracted purchase document, delivery document, sales document, warehousing document, transfer document, material transfer document, and document of changes in inventory, the return document comprises return purchase document, material return document, subcontracted return purchase document, and sales return document;

wherein the database further comprises the third data, the third data comprises source manufacturing order, requisition manufacturing order, and batch number manufacturing process data, the batch number manufacturing process data comprises process, manufacturing process, manufacturing batch number, parent manufacturing batch number, and requisition batch number, the source document and the return document record the first data and/or the third data, respectively;

wherein in the step of establishing the traceability node by mathematical operation, a procedure of retrospectively tracing batch number is used to trace a flow direction of the product, and the procedure of retrospectively tracing batch number comprises following steps of:

step h1: querying whether the sales document, the warehousing document, the subcontracted purchase document and/or the purchase document matching the identification data existing in the database;

step h2: in step h1, if the sales document, the warehousing document, the subcontracted purchase document and/or the purchase document matching the identification data existing in the database, respectively generating a sales type batch number sub-node, a self-made type batch number sub-node, a subcontracted type batch number sub-node and/or a purchase type batch number sub-node, querying the corresponding source document and/or return document, and calculating a quantity of the batch number to be checked recorded on the source document and the return document;

step h3: in step h1, if the sales document, the warehousing document, the subcontracted purchase document and/or the purchase document matching the identification data being not existing in the database, querying whether the identification data being a manufacturing batch number;

step h4: in step h3, if the identification data being a manufacturing batch number, further determining whether the source manufacturing order correlated to the manufacturing batch number being related to the transfer document in the database;

step h5: if the transfer document matching the source manufacturing order correlated to the manufacturing batch number existing in the database, generating an in-process type manufacturing batch number sub-node, reading the transfer document in each of the databases, and calculating a quantity of the batch number to be checked recorded on the transfer document; if the transfer document matching the source manufacturing order correlated to the manufacturing batch number being not existing in the database, generating a planned type manufacturing batch number sub-node, querying the source manufacturing order matching the manufacturing batch number in each of the databases, and calculating a quantity of the source manufacturing order;

step h6: in step h3, if the identification data in the database being not a manufacturing batch number, determining whether the identification data being correlated to a document of changes in inventory; and step h7: in step h6, if the document of changes in inventory correlated to the identification data existing in the database, generating an initial inventory type inventory leaf node, and calculating a quantity of the batch number to be checked recorded on the document of changes in inventory; if the document of changes in inventory correlated to the identification data being not existing in the database, generating an unknown inventory type inventory leaf node, and calculating an inventory quantity of the product;

wherein, the sales type batch number sub-node, the self-made type batch number sub-node, the subcontracted type batch number sub-node, the purchase type batch number sub-node, the in-process type manufacturing batch number sub-node, the planned type manufacturing batch number sub-node, the initial inventory type inventory leaf node, and the unknown inventory type inventory leaf node respectively establish a connection relationship with the traceability node.

* * * * *